No. 835,377. PATENTED NOV. 6, 1906.
A. SWAN.
MACHINE FOR BASING INCANDESCENT LAMPS.
APPLICATION FILED MAR. 17, 1905.

WITNESSES
J. Elli Glen
Helen Orford

INVENTOR
Alfred Swan.
by Albert G. Davis
Atty.

No. 835,377. PATENTED NOV. 6, 1906.
A. SWAN.
MACHINE FOR BASING INCANDESCENT LAMPS.
APPLICATION FILED MAR. 17, 1905.

WITNESSES.
J. Ellis Glen.
Helen Alford

INVENTOR.
Alfred Swan.
by Albert G. Davis
Atty.

No. 835,377. PATENTED NOV. 6, 1906.
A. SWAN.
MACHINE FOR BASING INCANDESCENT LAMPS.
APPLICATION FILED MAR. 17, 1905.

WITNESSES.
J. Ellis Glen.
Helen Alford.

INVENTOR.
Alfred Swan.
by Albert G. Davis
Atty.

No. 835,377. PATENTED NOV. 6, 1906.
A. SWAN.
MACHINE FOR BASING INCANDESCENT LAMPS.
APPLICATION FILED MAR. 17, 1905.
6 SHEETS—SHEET 6.

WITNESSES
J. Ellis Glen.
Helen Oxford

INVENTOR.
Alfred Swan
by Albert G. Davis
Atty.

UNITED STATES PATENT OFFICE.

ALFRED SWAN, OF NEW YORK, N. Y., ASSIGNOR TO GENERAL ELECTRIC COMPANY, A CORPORATION OF NEW YORK.

MACHINE FOR BASING INCANDESCENT LAMPS.

No. 835,377.     Specification of Letters Patent.     Patented Nov. 6, 1906.

Application filed March 17, 1905. Serial No. 250,690.

*To all whom it may concern:*

Be it known that I, ALFRED SWAN, a subject of the King of Great Britain, residing in the city, county, and State of New York, have invented certain new and useful Improvements in Machines for Basing Incandescent Lamps, of which the following is a specification.

This invention relates to machines for applying bases to the bulbs of incandescent lamps; and its object is to provide a machine for doing this work instead of doing it by hand, and in this way to greatly reduce the cost of basing lamps, to increase the number of lamps that an operator can base in a given time, and to insure firmly uniting the base to the lamp-bulb, with its axis coincident with the axis of the bulb.

The type of lamp-base now in common use consists of a metallic shell closed at one end by a web of insulating material, through which is a small opening for one of the leading-in wires of the lamp. Located centrally in this web is the center metallic contact of the base, which may be applied thereto either before or after the base is secured on the lamp-bulb. The neck of the bulb is inserted in the other end of the shell and the shell is held firmly thereto by cement.

Prior to my invention the work of applying bases to incandescent lamps was done largely by hand. The base was partially filled with a hot plastic cement compound and placed over the neck of the lamp, and pressure was then applied to hold it firmly thereon while the cement compound cooled and hardened. Basing lamps in this way has always been slow and expensive, and, moreover, it often happens that the base is not perfectly straight on the bulb. To overcome these disadvantages, I have provided a machine for doing this work. In operating with the machine I use a hard pellet of cement compound which can be dropped into the lamp-base and afterward softened by heat. This pellet, which is somewhat smaller than the base of the lamp and provided with an opening therethrough, is dropped into the base, and one of the leading-in wires is threaded through the opening therein and the small opening in the center of the base. The parts are held together by one or both of the leading-in wires while they are passing through a heater which softens the pellet. The bulb, with the base hanging thereto, is then automatically transferred to a machine, by which the bulb and base are pressed together, and while in this machine the cement is cooled, and thus hardened, whereupon the based lamp is automatically ejected from the machine.

The details of construction and the mode of operation of my improved basing-machine will be better understood by reference to the following description, taken in connection with the accompanying drawings, which show the preferred embodiment of my invention.

Figure 1:
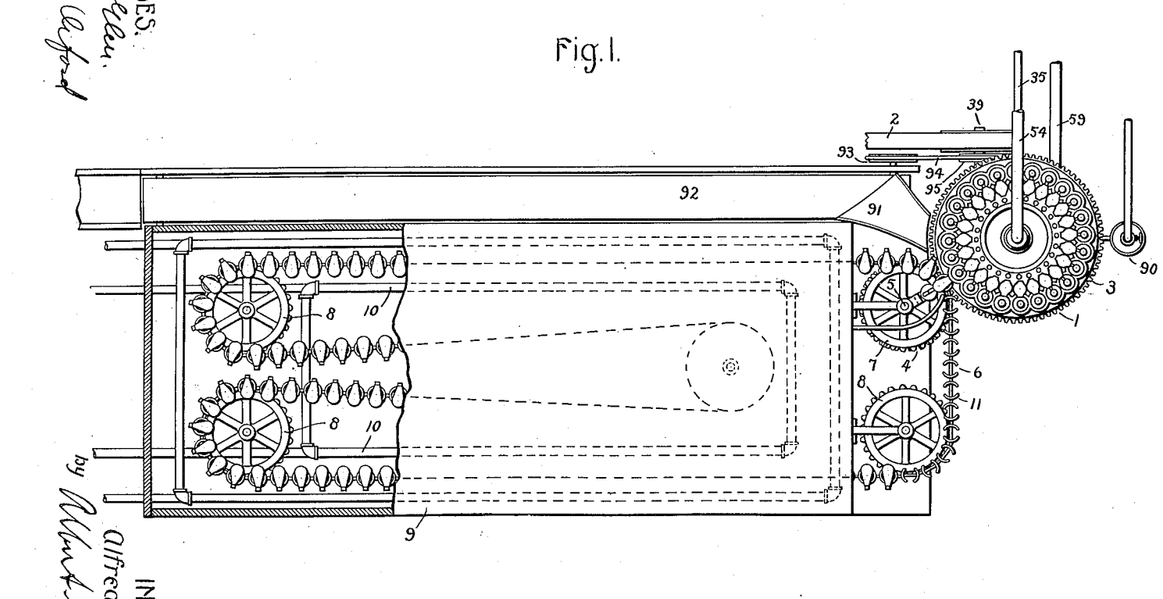
Figure 1 is a plan view of the machine broken away in part.
Figures 2, 3, 4, 5:
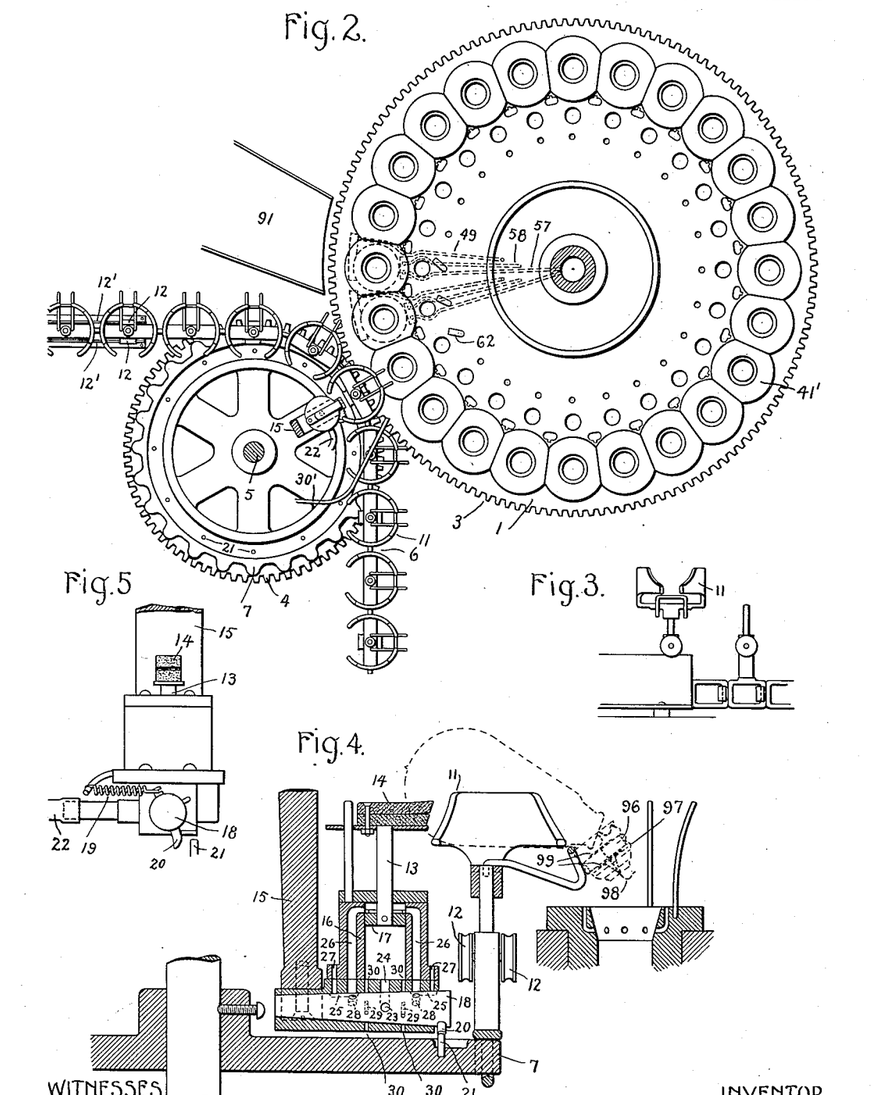
Fig. 2 is an enlarged plan view of a portion of the same.
Fig. 3 is a detail view of the carrier.
Fig. 4 is a sectional elevation of the carrier and the means for transferring the lamps from the carrier to the machine.
Fig. 5 is a front elevation of the plunger shown in Fig. 4.

Referring to the drawings, 1 indicates a supporting member mounted for rotation and driven by a belt 2 from any suitable source of power. The member 1 is provided with a plurality of receptacles for the lamps to be based. In the present machine I have shown twenty-four of these receptacles; but the number may be varied as desired. The periphery of the member 1 is formed with teeth constituting a gear 3, which meshes with a gear-wheel 4, secured on a shaft 5, and thus drives the carrier. This carrier consists of an endless-chain 6, running on a sprocket-wheel 7, secured to shaft 5, and a plurality of idle sprocket-wheels 8, which guide the carrier back and forth through a heater 9, heated by ranges of steam-pipes 10. Secured to chain 6 are a plurality of holders 11, as shown in Figs. 3 and 4, for supporting the bulbs of incandescent lamps. On the supportingposts of alternate holders are short shafts each carrying a roller 12 on each end, and within the heater suitable tracks 12' are arranged adjacent to the path of movement of the chain 6, on the upper edge of which the rollers 12 12 bear to prevent sagging of the chain. The lamp-bulbs, each with a pellet of cement compound and a base held thereto by one of the leading-in wires, are placed on the holders of the carrier, which take them through the heater, where the cement is softened, and as each holder reaches the line of centers of the member 1 and wheel 4 devices are operated automatically to push the lamp from the carrier into a receptacle on the supporting member. These devices consist of a plunger 13, which is reciprocated by compressed air and which carries on its upper end a piece of heavy felt 14, adapted to strike the end of the bulb and tilt it in the holder, so that it slides into the receptacle. This plunger is carrier by an arm 15, on which is mounted a cylinder 16, in which a piston 17 on the end of the plunger-rod 13 moves. A valve 18, located in a bore in arm 15, is operated to admit air to and permit its exhaustion from either side of the piston. This valve is normally held at one of the limits of its movement by a spring 19, Fig. 5, and depending from its end is a projection 20, which is engaged by pins 21 on the wheel 7 to turn the valve on its axis to the position shown in Fig. 4 and then release it, whereupon the spring 19 retracts it to its former position. Air under pressure is led to the valve 18 by an air-supply pipe 22. In the position of the valve shown in Fig. 4 a passage-way 23 connects the air-supply pipe 22 with an opening 24, leading to the under side of the piston 17, and two passage-ways 25 connect openings 26 to the upper side of the piston with openings 27 to the air. When valve 18 is shifted by spring 19 to the position shown in Fig. 5, these connections are closed, and two passage-ways 28 connect the air-supply pipe 22 with the openings 26 to the upper side of the piston 17, and two passage-ways 29 connect openings 30 from the under side of the piston 17 to the air. It will thus be seen that in one position of the valve air is admitted to the under side of the piston and exhausted from the upper side, so that the rod 13 is pushed up, and its felt-covered end hits the bulb and slides it out of the holder, and in the other position of the valve air is admitted to the upper side of the piston 17 and exhausted from the under side, so that the rod 13 is moved down again. As there are two pipes leading to the upper side of the piston, air is admitted freely, and the downward movement of the rod is effected very quickly, so that the end of the plunger is withdrawn immediately from the path of movement of the holders 11. The parts are so arranged that successive receptacles on the member 1 and successive holders 11 arrive at the line of centers of member 1 and wheel 4 together, and when in this position the plunger 13 is operated by the engagement of one of the pins 21 on wheel 7 with the projection 20 on valve 18. A pipe 30', connected to a source of supply of compressed air, directs a blast against each bulb as it drops into its receptacle to assist in positioning it properly therein.

Figure 6:
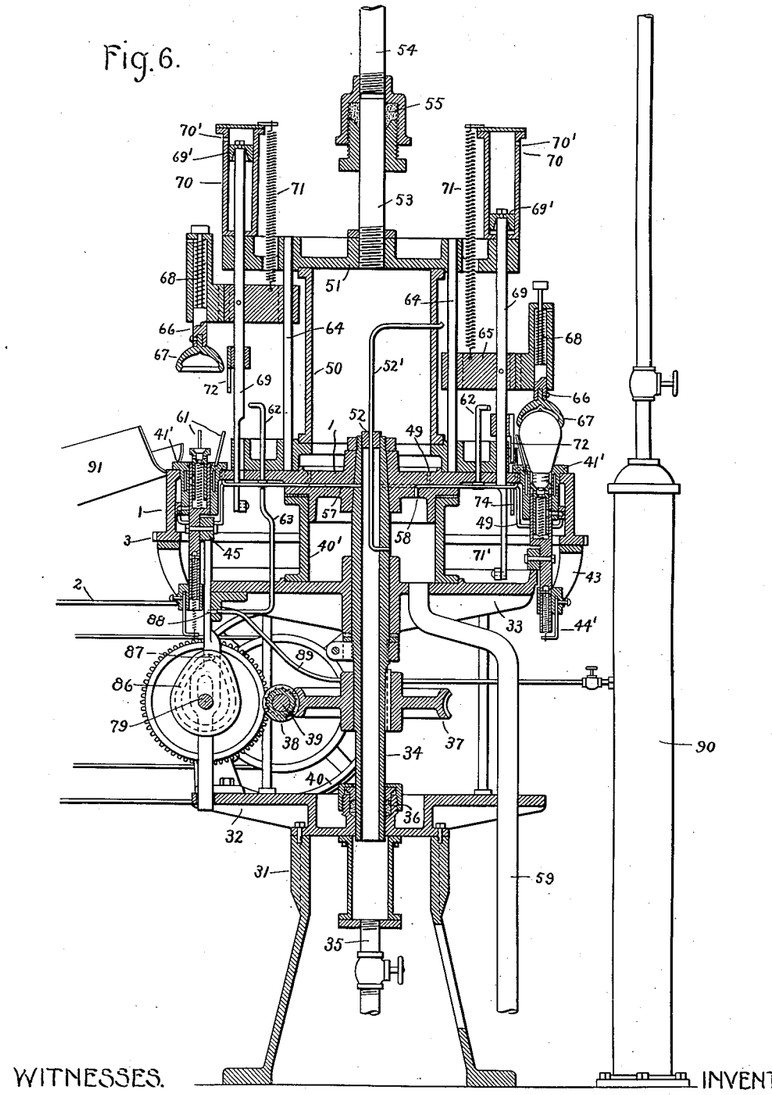
Fig. 6 is a sectional view of the basing-machine.
Figure 7:
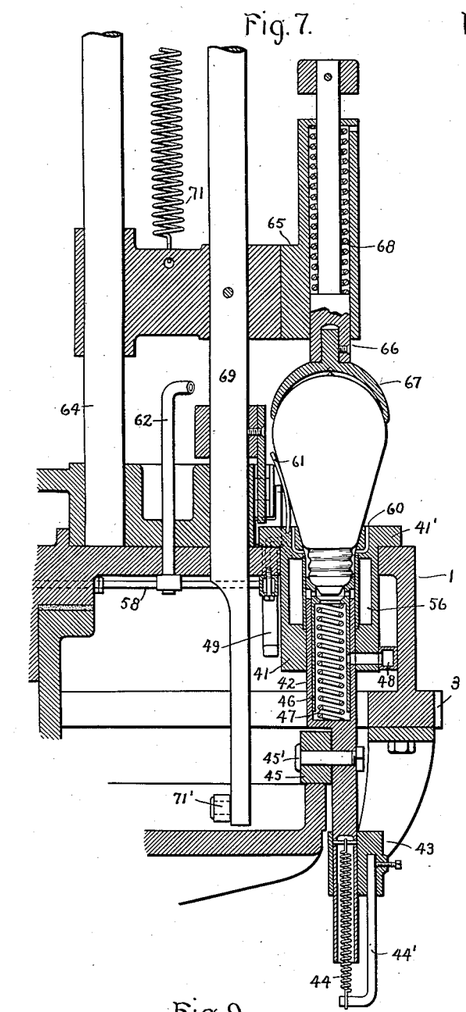
Fig. 7 is an enlarged section of one of the pressing and cooling devices.
Figure 8:
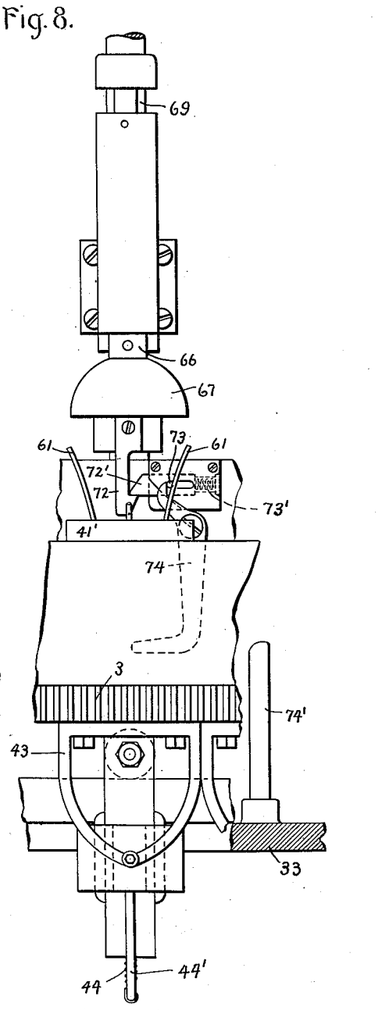
Fig. 8 is an elevation of the same.
Figure 9:
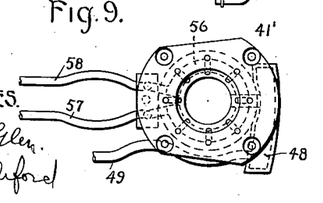
Fig. 9 is a plan view of one of the receptacles.

The machine for pressing the lamp parts together and cooling the cement consists of a standard 31, Fig. 6, carrying a lower plate 32 and an upper plate 33, in which are bearings for a hollow vertical shaft 34. A water-supply pipe 35 connects with the lower end of the shaft 34, a suitable stuffing-box 36 being provided to prevent leakage. Keyed to shaft 34 is a worm-wheel 37, with which meshes a worm 38 on the driving-shaft 39 of the machine, which carries a pulley 40 and is driven by the belt 2, running on the pulley. Secured to the upper end of the shaft 34 is the member 1, which carries the receptacles for the lamps. A cylindrical casting 40', mounted on the upper plate 33, has its top machined to form a bearing for the member 1, which rests thereon. Each of the twenty-four receptacles consists of a hollow cylinder 41, Figs. 7 and 9, located in an opening in member 1 and having a flange 41' at its upper end, which rests on the upper surface of the member. Vertically movable within the receptacle is a hollow plunger-rod 42, having an extension at its lower end which slides in a bearing formed in a depending portion 43 of the member 1. A spring 44 is attached at one end to the plunger-rod and at the other to a bracket secured to the depending portion 43 and tends to pull the plunger-rod 42 downward in the receptacle 41. Fastened to the rod 42 is a bolt 45', carrying a roller 45, which coöperates with a cam-surface to position the plunger-rod. Movable vertically in the opening in the plunger-rod 42 is a sleeve 46, the upper end of which is formed to fit the closed end of the base of a lamp, and a coiled spring 47 within this sleeve engages a shoulder on the sleeve at its upper end and the bottom of the opening in the plunger-rod at its lower end and tends to force the sleeve upward in the opening in the rod. In the sleeve 46, the plunger-rod 42, and the receptacle are openings which when the parts are in the position shown in Figs. 7 are in alinement with each other and with an opening in a chamber 48, which is connected by a pipe 49 with an air-chamber formed by the member 1, a cylindrical casting 50, carried thereby, and a cover-plate 51. The top of shaft 34, which enters this chamber, is closed by a plug 52. A pipe 52' extends through the casting 50, the plug 52, and the shaft 34 and forms a passage-way for oil for lubricating the upper bearing of shaft 34. Extending into an opening in the cover-plate 51 is a tion, and the cross-head is then raised to its former position to receive the roller 71' on the end of the next rod 69. In order to avoid the possibility of damage to the machine resulting from the engagement of one of the rollers 71' with the projection 77, the latter is mounted upon a sleeve 77', Fig. 13, vertically movable on the rod 76' and rotatable in a bore in the cross-head 76. Vertical movement of the sleeve 77' independent of the cross-head is prevented by a hub 82, secured to the lower end of the sleeve, to which is secured the end of a flexible cord 82', which extends partially around the hub in a groove therein, then through an opening in the link 81' and has its end attached to the end of a coiled spring 83, the other end of which is secured to a pin on the link 81'. Thus if a roller 71' engages the projection 77 the sleeve 77', carrying the projection, is turned on the rod 76' to permit the roller 71' to pass by, and as the spring 83 is put under tension when the sleeve is turned this spring draws the sleeve and projection back to their normal positions as soon as the roller 71' releases it.

Figure 13:
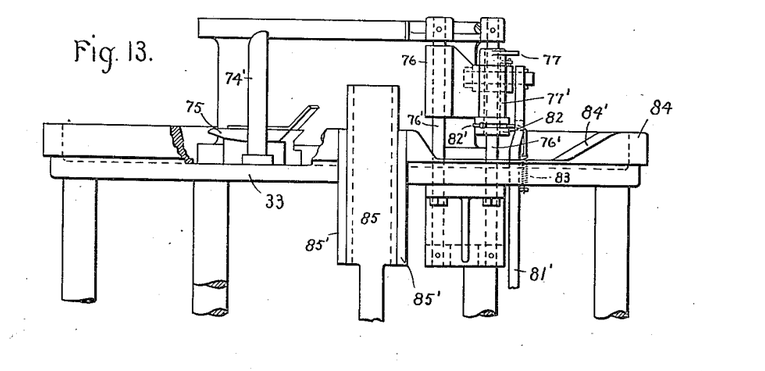

The means for positioning the lower plunger-rods 42 consists of a cam 84, formed on the edge of the upper plate 33, on which the rollers 45, secured to the plunger-rods, roll. In the position where the lamps are transferred from the carrier to the machine by the mechanism above described this cam is cut away, as shown in Fig. 13, so that each plunger-rod is drawn down in its receptacle by its spring 44 to permit the lamp to fall in proper position in the receptacle. Immediately after passing from this position each roller 45 rolls up an incline 84' on the cam 84, so that plunger 42 is raised vertically and presses against the base of the lamp. At the top of this incline the cam-surface is horizontal around more than three-quarters of the circumference of the machine, and as the roller 45 is moving along this surface the bulb and base are pressed together, and the cement is cooling. The rod 69 is then pulled down by cam 75, and latch 72' is pressed back. Cam 75 then releases arm 65, and spring 71 pulls arm 65 and the rod 69 and cap 67, secured thereto, up, so that the lamp is then ready to be ejected from the machine. The means for accomplishing this consists of a rod 85, movable vertically in ways 85' and forming a movable section of the cam 84. Rod 85 is reciprocated vertically by a cam 86, Fig. 6, keyed to the shaft 79 and provided with a cam-groove, into which a pin 87 on the rod 85 extends. In the rod 85 is a groove or passage-way 88, which when the rod is in its uppermost position, as shown in Fig. 6, connects the end of pipe 63 with a pipe 89, leading from a source of supply of compressed air 90. Thus when the roller 71' moves onto the end of the rod 85 the rod is raised vertically by cam 86, pushing the lamp up in the receptacle. As the rod 65 reaches the upper limit of its movement air is admitted from the source 90 through the pipe 89, passage-way 88, pipe 63, and the pipe 62 opposite the lamp, and the blast of air from pipe 62 blows the lamp over into a chute 91, down which it slides onto a belt 92, driven by a pulley 93, and belt 94 from a pulley 95 on the power-shaft 39. When the lamp is ejected, the plunger-rod 42 is drawn down again to its original position by the cam 86, and the roller 45 moves onto the stationary portion of the cam, which is here cut away to allow the plunger-rod to be drawn down in the receptacle by its spring 44 to permit another lamp to be inserted therein.

The operation of the machine as thus constructed will be understood from the foregoing description.

The parts for the lamps are assembled as shown in Fig. 4. The pellet 96, of cement compound, is dropped into the base 97, and one of the leading-in wires 98 is threaded through the opening in the pellet and the opening in the base of the lamp. I prefer to place a small thin washer 99, of paper or other suitable material, on each side of the pellet 96 to prevent the cement when softened from running up or down along the leading-in wire. The other leading-in wire is soldered to the shell of the base and holds the base on the bulb, or it may be bent back along the bulb, so that it may be soldered to the base after the latter has been secured to the bulb, and the parts may be held together by bending over the wire extending through the opening in the center contact. The parts for the lamps thus assembled are placed on the holders 11 and carried thereby through the heater, where the pellets 96 are softened. As each lamp comes opposite the plunger 13 one of the pins 21 on wheel 7 operates the valve 18, and the plunger is raised until it hits the end of the bulb and slides it off of the holder and into a receptacle on the basing-machine. The wires 61 and the blast of air from pipe 30' guide the base parts into the receptacle properly. Thus each receptacle as it comes opposite the plunger 13 is supplied with the base and bulb for a lamp, the base containing just the amount of that soft cement compound necessary to hold the base firmly on the bulb. The lower plunger-rod 42 of each receptacle is in its lowermost position when the lamp parts are supplied thereto, as the roller 45 on the rod is then on the cut-away portion of the edge of the upper plate 33, which forms the cam 84. Also the cap 67 is held in the raised position by the spring 71. As each receptacle is moved from this position the roller 45 travels up the incline 84' of the cam 84, thus raising the lower plunger-rod 42 until the top of the sleeve 46 therein engages the base of the lamp. The roller 71' on the end of the rod pipe 53, which connects with an air-supply pipe 54, a suitable stuffing-box 55 being provided to prevent leakage of air at the joint. In the receptacle 41 is a chamber 56, (shown in dotted lines in Fig. 9,) which extends almost entirely around the opening in the receptacle. Pipes 58 and 57 connect with the ends of this chamber, pipe 57 being connected to the opening in the hollow shaft 34 and pipe 58 with a chamber formed by the upper plate 33, the cylindrical casting 40', and the member 1. A waste-pipe 59 communicates with this chamber. Extending from the top of each of the receptacles 41 down a short distance to the opening therein are a plurality of passage-ways 60 to permit the escape of gases which may accumulate in the receptacles. Secured in the top of the receptacle are guide-wires 61, which guide the bulb into its proper position in the receptacle when it is transferred thereto from the carrier. Arranged adjacent to each receptacle is an L-shaped tube 62, open at both ends, the upper end of which is directed toward the position of the top of a bulb held in the receptacle. The lower end of each of these tubes extends through the member 1, so that when the receptacle corresponding to that tube is in the position for ejecting the lamp therein the lower end of the tube 62 is in alinement with an air-pipe 63. Mounted vertically between the member 1 and the top plate 51 are a plurality of rods 64, one for each receptacle, on each of which is slidingly mounted an arm 65, having a long bore in its outer end in which is the upper plunger-rod 66. At its lower end rod 66 carries a cap 67, adapted to fit over the top of the lamp-bulb. A spring 68 is arranged between a shoulder on rod 66 and the top of the opening in arm 65 to press the rod and the cap carried thereby downward. The upper and lower plunger-rods, the cap 67, and the sleeve 46 are all in axial alinement. Secured to each arm 65 is a rod 69, the upper end of which extends up through an opening in the top plate 51 and carries the piston 69' of a dash-pot 70. The dash-pot is entirely closed, except for a small opening 70' a short distance below its upper end. A strong coiled spring 71 has one end attached to the top of the dash-pot 70 and the other end to the arm 65 to pull the arm 65 and all the parts secured thereto upward. The lower end of rod 69 extends down through an opening in the member 1 and carries a roller 71', by which the rod and the arm 61 are drawn down to press the lamp-bulb into the base. When the arm is drawn down, it is held in this position to keep the bulb and base under compression while the cement in the base is cooling and hardening. The means for doing this consists of a hook 72, secured to the rod 69, and a latch 72', urged forward in a suitable casing by a spring 73'. The latch 72' has a stud 73 extending through a slot in the casing, and one end of a pivoted dog 74 engages this pin. A post 74' is mounted upon the upper plate 33 in position to engage the lower end of the dog 74 and rock it on its pivot, so as to push the latch 72' back against the tension of its spring to permit an upward movement of rod 69 when the lamp in the receptacle has been based and has arrived at the position for ejecting. In order that the coöperating edges of the hooks 72 and the latches 72' may not be worn off, as they would be if the rods 69 were suddenly released by pulling the latches 72 back, I provide means for relieving each latch of the strain of the hook just before the rod starts on its upward movement. Mounted on the upper plate 33 in position to engage the roller 71' of each rod 69 just before the dog 74 corresponding to that rod engages the post 74' is a cam 75, under which each roller 71' passes and by which the roller and the rod 69, to which it is secured, are drawn down enough to carry the hook 72 on the rod 69 away from its latch 72'. While held in this relation by the cam 75, the dog 74 is operated by post 74' to press the latch 72' back out of the path of movement of hook 72. The rod 69 can then be drawn upward free of latch 72'. In order that this upward movement may start slowly, the cam 75 is extended, and this extended portion is inclined to the horizontal, as shown in Fig. 13, so that as the movement of the roller under the cam is continued the spring 71 draws the arm 65 and the rod 69 up. As the roller passes out from under the cam the arm and rod are quickly drawn to the uppermost position, this movement being cushioned by the dash-pot 70.

Figures 10, 11:
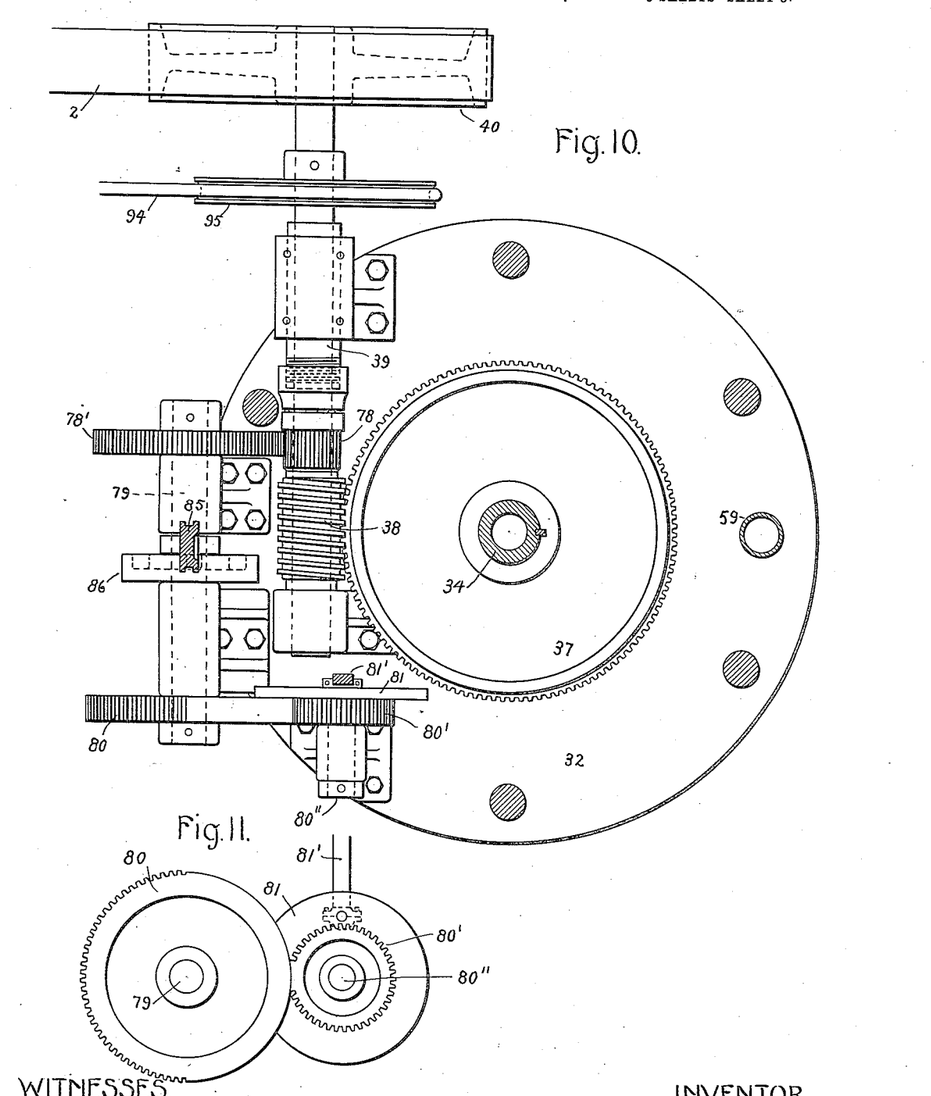
Fig. 10 is a horizontal section of the machine, showing a portion of the operating mechanism.
Fig. 11 is a detail view of one of the pairs of gears shown in Fig. 10, and Figs. 12 and 13 are a horizontal section and an elevation of the mechanism for operating the compressing-plungers.
Figure 12:
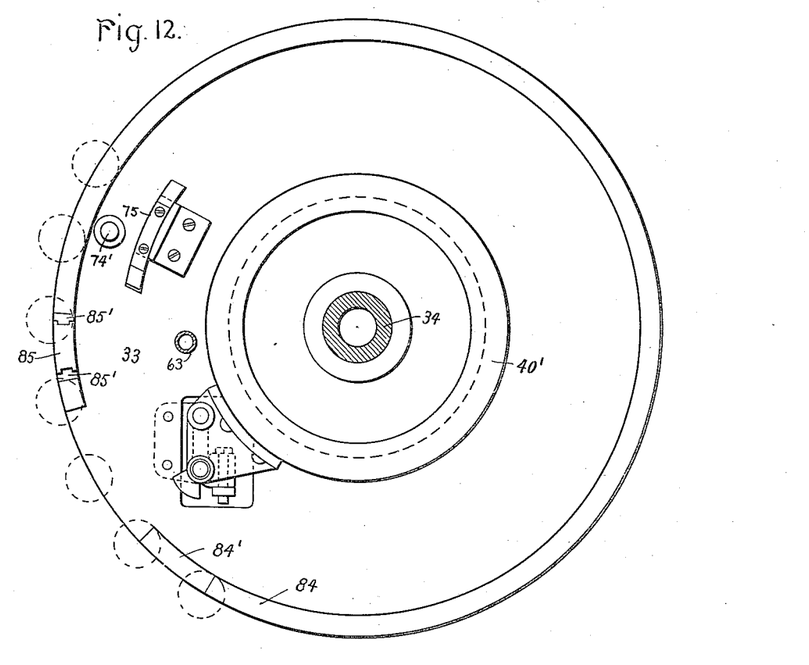

The mechanism for pulling the rod 69 down, so as to bring the cap 67 over the bulb of the lamp, in which position the rod is locked by the hook 72 and latch 72', consists of a cross-head 76, Figs. 12 and 13, movable vertically upon rods 76' and provided with a projection 77, under which each roller 71' on the end of a rod 69 moves. On the drive-shaft 39, Fig. 10, is a pinion 78, which meshes with a gear 78' on a shaft 79. On the end of shaft 79 is one of a pair of intermittent gears 80 and 80'. (Shown in detail in Fig. 11.) The gear 80' is carried by a short shaft 80'', mounted in a bearing on the lower plate 32. The arrangement of these gears is such that the gear 80' makes one complete revolution during a half-revolution of the gear 80 and remains at rest during the other half revolution. Secured to the gear 80' is a disk 81, to which the end of a link 81' is eccentrically pivoted. The other end of link 81' is pivoted to the cross-head 76. Thus when a roller 71' on one of the rods 69 comes under the projection 77 and the gear 80' makes one revolution, the link 81 and the cross-head 76 are drawn down, the projection 77, carrying with it the rod 69 until the rod is locked in its lowermost posi- 69 of this receptacle has now come under the projection 77 on the cross-head 76 and at the same time that the lower plunger-rod 42 is moved up the intermittent gears 80 80' operate the link 81' to pull down the crosshead 76, and the projection 77 thereon carries with it the roller 71', rod 69, and the arm 65, secured to rod 69, thus bringing the cap 67 down over the top of the bulb. When the rod 69 reaches its lowest position, the hook 72 thereon catches over the latch 72', and the rod is held in this position, while the crosshead 76 and projection 77 are returned to their normal positions to repeat the operation on the rod of the next receptacle. The base and the bulb are thus pressed together under heavy pressure, the springs 47 and 68 allowing for any slight differences in the size of the bulb and base. When the parts are in this position, air is admitted from the supply-pipe 54 through pipe 53, pipe 49, to chamber 48, and from there through the openings in the receptacle, the plunger-rod, and the sleeve 46 to the under side of the base. From there the air passes up around the base and out the small passages 60, and not only assists in cooling the base and the cement therein, but also carries out with it any gases which may accumulate in the receptacle around the base. Water from the supply-pipe 35 flows up through the hollow shaft 34 through pipe 57 to the chamber 56 in the receptacle, which almost completely surrounds the base, and out by the pipe 58 and the waste-pipe 59. The parts remain in this relation while the receptacle is moved around over three-fourths of a revolution of the supporting member 1, and during this time the circulation of water cools the cement compound until it is quite hard. The roller 71' on the rod 69 then engages the cam 75, and the rod is drawn down thereby just far enough to carry the hook 72 out of engagement with the latch 72', the spring 68 giving enough to permit this slight downward movement of the rod. On further turning movement of the supporting member the dog 74 engages the post 74' and the latch 72' is drawn back out of the path of movement of hook 72. As the turning movement continues the roller 71' moves up the inclined end of the cam 75 until finally it is released by the cam, and the spring 71 pulls the arm 65 and the parts carried thereby upward, the movement being cushioned by the dash-pot 70. This carries the cap 67 up off of the bulb, and the lamp is ready to be ejected from the machine. On further turning movement of the supporting member the roller 45 on the lower plunger-rod comes over the rod 85, and this rod is then raised vertically by the cam 86. As the rod 85 reaches its uppermost position the groove 88 therein connects the pipes 89 and 63 and air from the source of supply 90 flows through pipe 89, groove 88, pipe 63 to the pipe 62, which is arranged just back of the receptacle, and the blast of air from the pipe 62 blows the lamp over into the chute 91, by which it is carried down to the belt-carrier 92. The cam 86 then lowers the rod 85 to its former position, and the roller 45 on the lower plunger-rod passes off onto the cam 84. On further movement the roller 45 moves down the inclined portion of the cam, so that the lower plunger-rod 42 is drawn down in the receptacle by the spring 44, and the receptacle is ready to receive another lamp. It will thus be seen that the operation of basing the lamps is entirely automatic. One operator assembles the parts and places them on the holders 11, and the finished lamps are taken from the belt 92. The number of lamps that an operator can base in a given time is therefore greatly increased, and the cost of basing the lamps decreased. As the plungers 66 and 42 are arranged in axial alinement, each base is secured on its bulb in exactly the proper relation.

Many modifications can be made in the construction of the machine which I have illustrated and described herein without departing from the spirit of my invention, and I wish it understood that all such modifications I consider within the scope of my invention and that I aim to cover them in the claims appended hereto.

What I claim as new, and desire to secure by Letters Patent of the United States, is—

1. A basing-machine comprising a carrier for the lamp parts, devices for applying pressure to the bulb and base, and means for transferring the lamp parts from the carrier to the pressing devices.

2. A basing-machine comprising a carrier for the lamp parts, a heater adjacent to the carrier, devices for applying pressure, and means for transferring the lamp parts from the carrier to the pressing devices.

3. A basing-machine comprising a carrier for the lamp parts, a heater through which the lamp parts are carried thereby, devices for applying pressure to the bulb and base, and means for transferring the lamp parts from the carrier to the pressing devices.

4. A basing-machine comprising devices for pressing the bulb and base for a lamp together, a heater to heat a cementing compound in a base, and means for transferring the base with the cementing compound therein from the heater to the pressing devices.

5. A machine for basing incandescent lamps having means for pressing the bulb and base for a lamp together, and means for supplying bulbs and bases to the pressing means.

6. A machine for basing incandescent lamps having means for pressing the bulb and base for a lamp together, and means for ejecting the lamp from the machine.

7. A machine for basing incandescent lamps having means for pressing the bulb and base for a lamp together, and means for delivering an air-blast against the lamp to eject it from the machine.

8. A machine for basing incandescent lamps having means for pressing the bulb and base for a lamp together, means for supplying bulbs and bases to the pressing means, and means for ejecting the lamps from the machine.

9. A basing-machine comprising a carrier for the lamp parts, devices for applying pressure to the bulb and base, means for transferring the lamp parts from the carrier to the pressing devices, and means for ejecting the lamps from the machine.

10. A basing-machine comprising a carrier, a heater adjacent to the carrier for heating a cementing compound in a base on the carrier, devices for pressing the bulb and base for a lamp together, means for transferring the base with the heated compound therein from the carrier to the pressing devices, and means for ejecting the lamps from the machine.

11. A machine for basing incandescent lamps, having automatically-operated devices for pressing the bulb and base for a lamp together with their axes coincident and means for ejecting the lamp from the machine.

12. A machine for basing incandescent lamps, having automatically-operated devices for pressing the bulb and base for a lamp together, a heater to heat a cementing compound in the base, and means for cooling the base of the lamp.

13. A machine for basing incandescent lamps, having automatically-operated devices for pressing the bulb and base for a lamp together, a heater to heat a cementing compound in the base, and means for circulating a cooling agent about the base while the base and bulb are held under pressure.

14. A machine for basing incandescent lamps having automatically-operated devices for pressing the bulb and base for a lamp together, means for cooling the base of the lamp, and means for ejecting the lamp from the machine.

15. A basing-machine comprising automatically-operated devices for pressing the bulb and base for a lamp together, means for supplying the bulbs and bases to the pressing devices, and means for cooling the base while the bulb and base are held under pressure.

16. A basing-machine comprising devices for pressing the bulb and base for a lamp together, means for supplying the bulbs and bases to the pressing devices, means for cooling the base while the bulb and base are held under pressure, and means for ejecting the lamp from the machine.

17. A basing-machine comprising devices for pressing the bulb and base for a lamp together, a heater to heat a cementing compound in a base, means for transferring the base with the cementing compound therein from the heater to the pressing devices, and means for cooling the base of the lamp while held in said pressing devices.

18. A basing-machine comprising a carrier for the lamp parts, a heater through which the lamp parts are carried thereby, devices for pressing the bulb and the base for a lamp together, means for transferring the lamp parts from the carrier to the pressing devices, and means for cooling the base of the lamp while held in said pressing devices.

19. A machine for basing incandescent lamps having automatically - operated devices for pressing the base and bulb for a lamp together, a heater to heat a cementing compound in the base, a chamber arranged close to a base when held in the pressing devices, and connections to the chamber for circulating cooling water therethrough.

20. A basing-machine having a receptacle in which a lamp is based, two alined plungers associated therewith movable to press the bulb and base for a lamp together, a heater to heat a cementing compound in the base, and a chamber formed in the receptacle to receive a cooling agent.

21. A basing-machine having a receptacle in which a lamp is based, a plunger associated therewith movable to press the bulb and base for a lamp together, means for admitting air under pressure to the receptacle, and means for ejecting the lamp from the machine.

22. A basing-machine having a receptacle in which a lamp is based, two alined plungers associated therewith movable to press the bulb and base for a lamp together, connections for admitting air under pressure to the receptacle, means whereby moving said plungers to press a bulb and base together opens said air connections, and means for ejecting the lamp from the machine.

23. A basing-machine having a receptacle in which a lamp is based, a plunger movable in axial alinement with the receptacle, means for moving the plunger into position to press a bulb and base together, a latch to hold the plunger in this position, and means for operating the latch to release the plunger.

24. A basing-machine having a receptacle in which a lamp is based, a plunger movable in axial alinement with the receptacle, means for moving the plunger into position to press a bulb and base together, a latch to hold the plunger in this position, a spring to move the plunger in the opposite direction, means for operating the latch, and means for releasing the plunger independent of the latch.

25. A basing-machine having a receptacle in which a lamp is based, a movable plunger the end of which forms the bottom of the receptacle, means for moving the plunger in the receptacle to press a base on a lamp, and means for causing a further movement of the plunger to facilitate ejecting the lamp from the receptacle.

26. A basing-machine having a receptacle in which a lamp is based, a movable plunger associated therewith, a cam to position the plunger, a movable section in said cam, and means for reciprocating said movable section.

27. A basing-machine having a receptacle in which a lamp is based, a movable plunger associated therewith, a rod secured to the plunger, a projection thereon, and means for positioning the plunger comprising a movable cross-head, a projection thereon coöperating with the projection on said rod, and means for reciprocating the cross-head.

28. A basing-machine having a receptacle in which a lamp is based, a movable plunger associated therewith, a rod secured to the plunger, a projection thereon, and means for positioning the plunger comprising a movable cross-head, a projection thereon coöperating with the projection on said rod, one of said projections being yieldingly held in position, and means for reciprocating the cross-head.

29. A basing-machine comprising a rotatable supporting member, a plurality of receptacles in which lamps are based carried thereby, means for supplying the lamp parts to the several receptacles successively, and means for pressing the lamp parts together.

30. A basing-machine comprising a rotatable supporting member, a plurality of receptacles in which lamps are based carried thereby, means for pressing the lamp parts together, and means for ejecting the based lamps operating on the several receptacles successively.

31. A basing-machine comprising a rotatable supporting member, a plurality of receptacles in which lamps are based carried thereby, a pair of pressing-plungers for each receptacle to press the bulb and base therein together with their axes coincident, means for operating the pairs of plungers successively and automatically, and means for ejecting the lamp from the machine.

32. A basing-machine comprising a rotatable supporting member, a plurality of receptacles in which lamps are based carried thereby, pressing-plungers for the several receptacles, means for automatically operating the plungers successively to press together the bulbs and bases in the receptacles, a heater to heat a cementing compound in the base, and means for cooling the base in each receptacle.

33. A basing-machine comprising a rotatable supporting member, a plurality of receptacles in which lamps are based carried thereby, a pressing-plunger for each receptacle, means for automatically operating the plungers successively to press together the bulbs and bases in the several receptacles, means for cooling the base in each receptacle, and means for ejecting the based lamps.

34. A basing-machine comprising a rotatable supporting member, a plurality of receptacles in which lamps are based carried thereby, a pressing-plunger for each receptacle, means for automatically operating the plungers successively to press together the bulbs and bases in the several receptacles, a heater to heat a cementing compound in the base, and means for maintaining a circulation of water through all the receptacles.

35. A basing-machine comprising a rotatable supporting member, a plurality of receptacles in which lamps are based carried thereby, automatically-operated devices for pressing together the parts for a lamp in the several receptacles successively, a heater to heat a cementing compound in the base, and means for cooling the bases of the lamps while held under compression.

36. A basing-machine comprising a rotatable supporting member, a plurality of receptacles in which lamps are based carried thereby, a pressing-plunger associated with each base, means for moving the several plungers successively into position for pressing the parts of a lamp together, a latch to hold each plunger in this position, means for automatically releasing the plungers, and a spring to retract each plunger.

37. A basing-machine comprising a rotatable supporting member, a plurality of receptacles in which lamps are based carried thereby, a pair of pressing-plungers for each receptacle, means for automatically operating the several pairs of plungers successively to press together the bulbs and bases in the receptacles, and means for moving the plungers successively to free the lamps, and means for ejecting the lamp from the machine.

38. A basing-machine comprising a rotatable supporting member, a plurality of receptacles in which lamps are based carried thereby, a pair of pressing-plungers for each receptacle, means for automatically operating the several pairs of plungers successively to press together the bulbs and bases in the receptacles, means for moving the plungers successively to free the lamps, and means for delivering a blast of air to remove the freed lamps.

39. A basing-machine comprising a rotatable member, a plurality of receptacles in which lamps are based carried thereby, a plunger for each receptacle to press together the parts of a lamp therein, means for automatically operating the several plungers successively, a carrier arranged adjacent to said member, and means for automatically transferring the lamp parts from the carrier to the successive receptacles on said member.

40. A basing-machine comprising a rotatable member, a plurality of receptacles in which lamps are based carried thereby, a plunger for each receptacle to press together the parts of a lamp therein, means for automatically operating the several receptacles successively, a heater arranged adjacent to said member to heat a cementing compound in the bases, and means for automatically transferring bases with the cementing compound therein from the heater to the several receptacles successively.

In witness whereof I have hereunto set my hand this 15th day of March, 1905.

ALFRED SWAN.

Witnesses:
S. N. WHITEHEAD,
JOHN E. MITCHELL, Jr.